Figure 1:
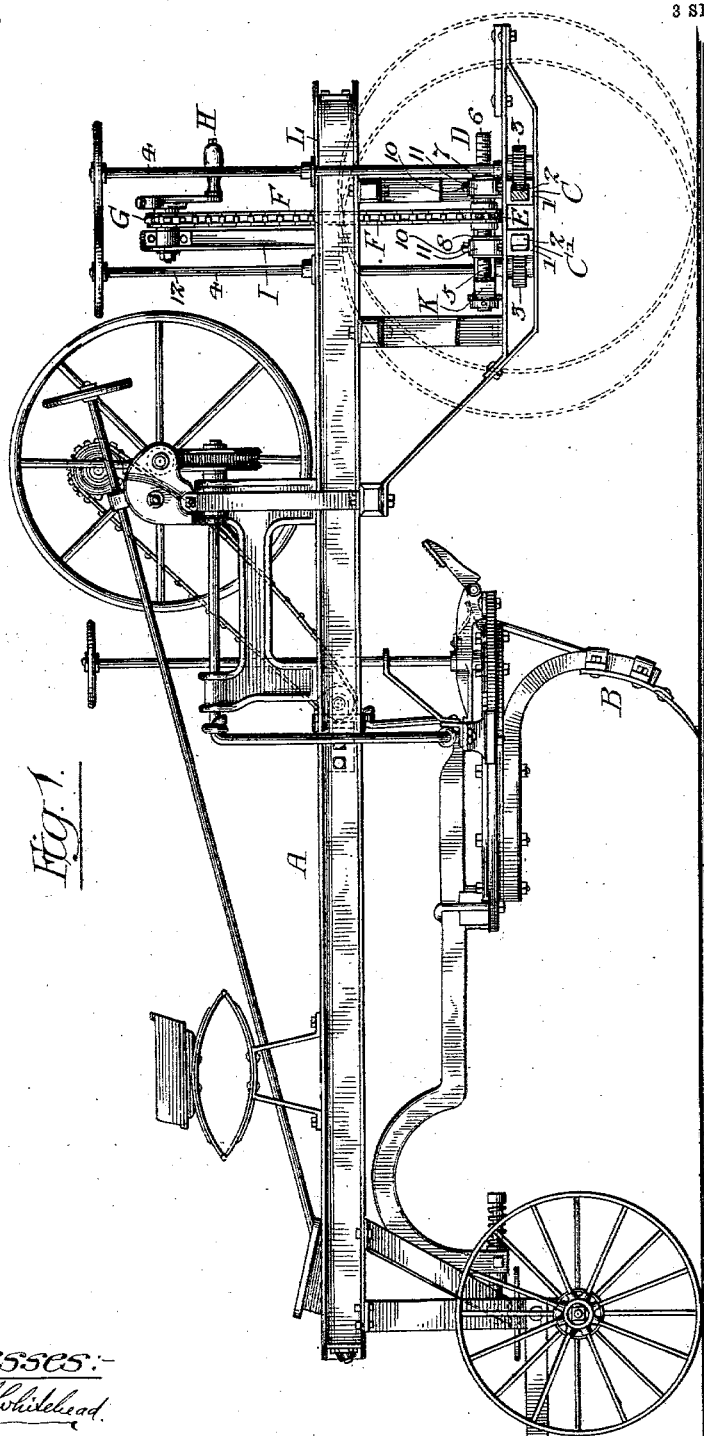

No. 753,277. PATENTED MAR. 1, 1904.
J. KROHN.
MACHINE FOR MAKING AND REPAIRING ROADS.
APPLICATION FILED SEPT. 18, 1903.
NO MODEL. 3 SHEETS—SHEET 1.

Witnesses:-

Inventor:-
John Krohn
by
Chas. G. Page
Atty.

No. 753,277. PATENTED MAR. 1, 1904.
J. KROHN.
MACHINE FOR MAKING AND REPAIRING ROADS.
APPLICATION FILED SEPT. 18, 1903.
NO MODEL. 3 SHEETS—SHEET 2.
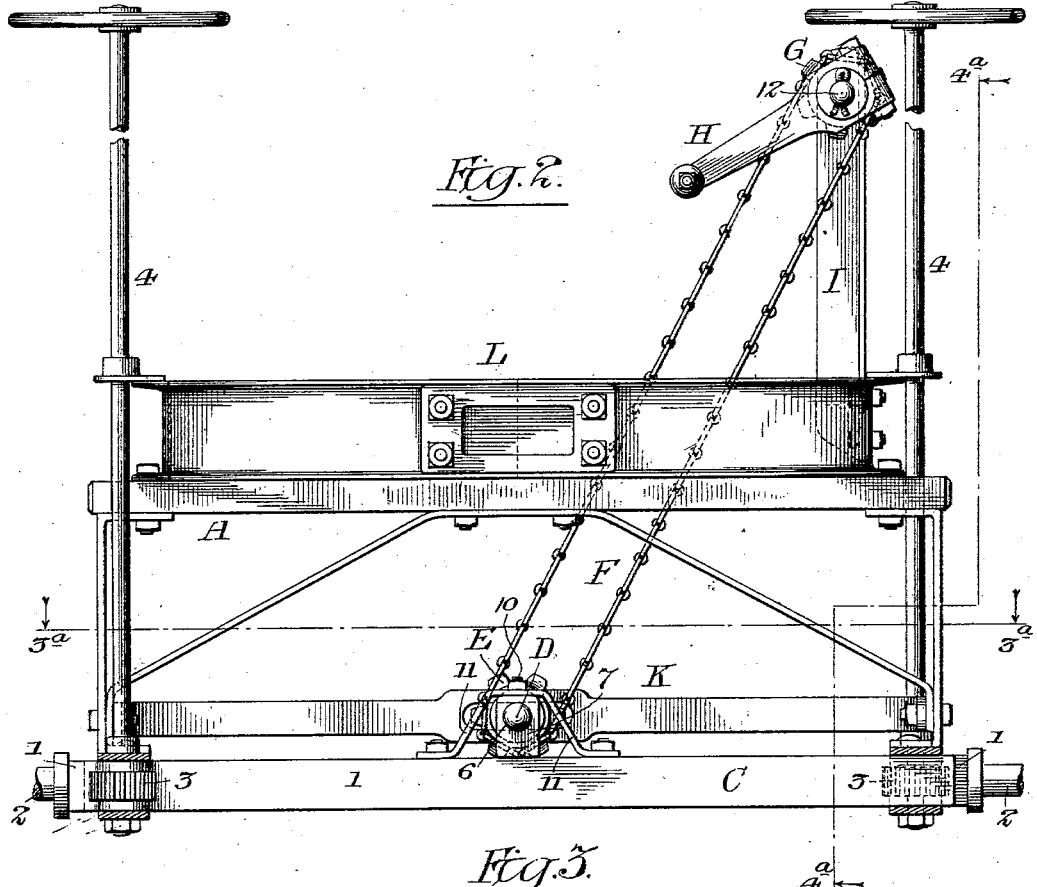
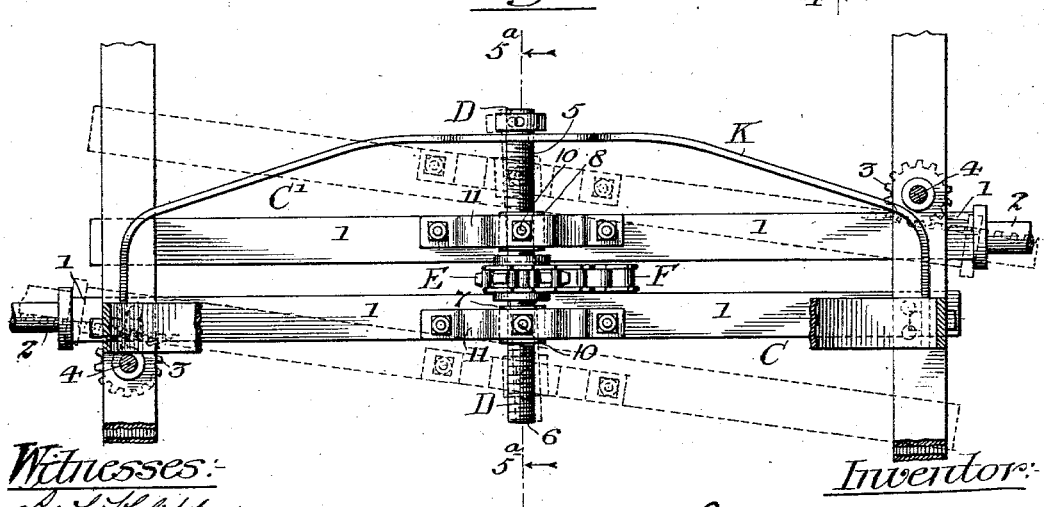
Witnesses:-
Louis M. F. Whitehead
Ottilie C. Freiberg
Inventor:-
John Krohn
by Chas. G. Page
atty.

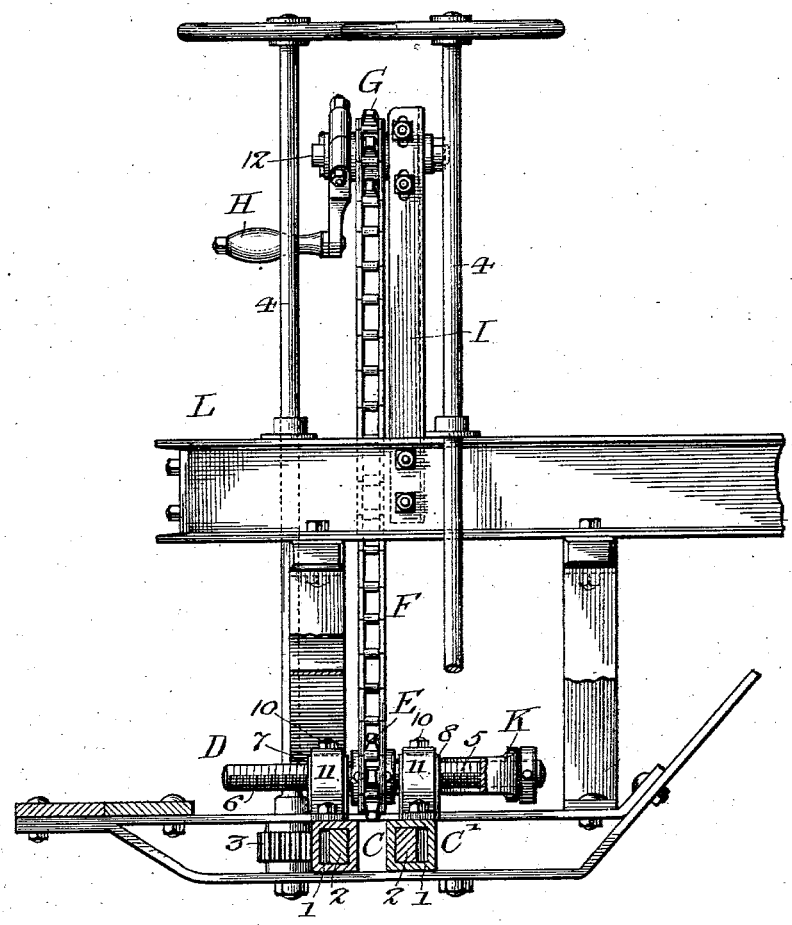

No. 753,277.

Patented March 1, 1904.

UNITED STATES PATENT OFFICE.

JOHN KROHN, OF BARBERTON, OHIO, ASSIGNOR TO NATIONAL DRILL AND MANUFACTURING COMPANY, OF CHICAGO, ILLINOIS, A CORPORATION OF WEST VIRGINIA.

MACHINE FOR MAKING AND REPAIRING ROADS.

SPECIFICATION forming part of Letters Patent No. 753,277, dated March 1, 1904.

Application filed September 18, 1903. Serial No. 173,687. (No model.)

*To all whom it may concern:*

Be it known that I, JOHN KROHN, a citizen of the United States, residing at Barberton, in the county of Summit and State of Ohio, have invented certain new and useful Improvements in Machines for Making and Repairing Roads, of which the following is a specification.

My invention relates to road-making and road-repairing machines of the class in which the scraper-blade is arranged for horizontal diagonal adjustment between the front and rear wheels of a suitable carriage or body frame, the rear wheels being arranged upon horizontally-swinging axle-sections, which can be adjusted longitudinally for the purpose of varying the spread of the rear wheels, substantially as illustrated in Letters Patent of the United States No. 724,042, dated March 21, 1903.

Objects of my invention are to provide simple and highly-effective means for adjustably swinging the rear-axle sections, to avoid lost motion in thus adjusting said rear-axle sections, and to provide as a means for adjustably swinging the rear-axle sections a device which can be easily operated by an attendant in a way to readily overcome the resistance of such adjustment, it being understood that these machines are comparatively large and heavy and that in effecting a swinging adjustment on the part of the rear-axle sections considerable resistance must be overcome.

In the accompanying drawings, Figure 1 illustrates in side elevation a road-making and road-repairing machine embodying my invention, the rear wheels being indicated by dotted lines and one of the rear-axle sections being shown in cross-section. Fig. 2 is a rear end elevation of a portion of the machine. Fig. 3 is a detail view illustrating in top plan the swinging rear-axle sections or portions and means for adjusting them, said figure being produced by a section on line 3ª 3ª in Fig. 2. Fig. 4 is a detail view produced by a section on line 4ª 4ª in Fig. 2. Fig. 5 is a detail view produced by a section on line 5ª 5ª in Fig. 3.

The carriage or body frame A may be of any suitable construction—for example, such as illustrated in Patent No. 724,042—and the scraper-blade B can be arranged and supported for the several adjustments substantially as in said patent or in any other suitable way. The swinging rear-axle portions C C', as illustrated, are constructed and arranged for extensible adjustment, as in said patent, each axle section or portion being formed by a bearing guide or housing 1 and an axle-bar 2, having a telescoping connection therewith, the axle sections or bars 2 being adjusted longitudinally by means of pinions 3, secured upon hand-wheel shafts 4 and arranged to engage racks or rack-teeth on the axle parts or bars 2. It is therefore understood that the axle-bars 2 form the axle-sections proper and that these bars have sliding connections with swinging bearings 1, which are arranged for operation and adjustment as in the patent above referred to. As a means for effecting a longitudinally-swinging adjustment on the part of these rear-axle bars or sections 2 so as to skew the rear wheels and at the same time maintain a condition of parallelism between said axle-sections, I provide an adjusting-screw D, having relatively right and left threaded end portions 5 and 6 and arranged longitudinally as to the length of the machine, as best illustrated in Fig. 3. One threaded portion of this adjusting-screw engages a nut 7, while its opposite threaded portion engages a similar nut 8. These nuts 7 and 8 are swiveled upon the housings or bearings 1, whereby, in effect, the axle bars or sections 2 have sliding connection with these nuts, which in turn have, in effect, swiveled connection with said axle bars or sections. As illustrated in Fig. 5, each nut has a lower pin or journal 9, swiveled upon one of the housings or bearings 1, and a similar or like upper pin or journal 10, swiveled in a strap 11, which is arranged over the nut and bolted at its ends upon one of the housings or bearings 1. In order to operate this adjusting-screw alternately in opposite directions, it is provided with a sprocket E, which is rigidly secured upon the screw at a point between the swiveled nuts 7 and 8, and an endless sprocket belt or chain F is trained upon the sprocket E and also trained upon an upper sprocket G. The sprocket G is fixed upon a short rotary shaft 12, having a crank-arm H, by which it can be operated, said shaft 12 being supported upon the body-frame in an elevated position in any suitable way—as, for example, by a support I. The adjusting-screw D can be steadied and maintained in position by means of any suitably-arranged bearing or bearings. As illustrated in Fig. 3, a bar K is secured to the body-frame and adapted to provide a bearing for one end of the adjusting-screw. Broadly considered, the adjusting-screw can be rotatively adjusted by any desired means, and when thus adjusted it will cause the axle bars or sections and their housings to swing and to maintain a condition of parallelism, as indicated by dotted lines in Fig. 3, in which the operation of the screw has caused simultaneous swing on the part of the axle-sections and their housings or bearings, which have been swung in a direction to increase the space between them. A workman standing upon the rear platform L of the machine can readily operate the crank H, and by means of the power-transmitting mechanism employed he can readily overcome all oppsition on the part of the axle sections or portions to a horizontal swinging movement.

From the foregoing it will be seen that I provide an adjusting device having right-and-left screw portions, engaging nuts with which the axle-sections practically have shifting connection, and that I provide a gear or sprocket for operating said adjusting device with a yielding connection between said gear or sprocket and the longitudinally-adjustable axle-sections, whereby when said sections are swung horizontally they can maintain a condition of relative parallelism, it being observed that in the form or construction of connection between the gear or sprocket E and the longitudinally-adjustable axle-sections the swivel-pins 9 render such connection a yielding connection in contradistinction to a connection which is rigid.

What I claim as my invention is—

1. In a machine for making and repairing roads, involving a carriage and a diagonally-adjustable scraper-blade, a pair of swinging axle-sections for the rear wheels; and an adjusting device having right and left screw-threaded portions respectively engaging nuts having swivel connections with the swinging axle-sections.

2. In a machine for making and repairing roads, involving a carriage and a diagonally-adjustable scraper-blade, a pair of swinging axle-sections for the rear wheels; and an adjusting device comprising a single right-and-left screw engaging nuts having swivel connections with the swinging longitudinally-adjustable axle-sections.

3. In a machine for making and repairing roads, involving a carriage and a diagonally-adjustable scraper-blade, a pair of swinging and longitudinally-adjustable axle-sections for the rear wheels; and an adjusting device comprising a right-and-left screw engaging nuts having swivel connections with the swinging longitudinally-adjustable axle-sections; and a device for operating said right-and-left screw.

4. In a machine for making and repairing roads, involving a carriage and a diagonally-adjustable scraper-blade, a pair of swinging and longitudinally-adjustable axle-sections for the rear wheels; and an adjusting device comprising a right-and-left screw engaging nuts having swivel connections with the swinging longitudinally-adjustable axle-sections; and a device for operating said right-and-left screw comprising sprockets whereof one is applied to the right-and-left screw, and belt connection between said sprockets.

5. In a machine for making and repairing roads, involving a carriage and a diagonally-adjustable scraper-blade, a pair of swinging and longitudinally-adjustable axle-sections for the rear wheels; and an adjusting device comprising a right-and-left screw engaging nuts which are swiveled upon bearings with which the axle-sections have shifting connection.

6. In a machine for making and repairing roads, involving a carriage and a diagonally-adjustable scraper-blade, a pair of swinging and longitudinally-adjustable axle-sections for the rear wheels; an adjusting device having right-and-left screw portions engaging nuts with which the axle-sections have shifting connection; and a gear for operating the right-and-left screw with a yielding connection between said gear and the axle-sections.

JOHN KROHN.

Witnesses:
HARRY HIERS,
H. C. TULLY.